United States Patent [19]

Komlos et al.

[11] Patent Number: 4,965,926

[45] Date of Patent: Oct. 30, 1990

[54] TENSIONING ASSEMBLY APPARATUS HAVING TRANSDUCERS MOUNTED ON THE PROJECTIONS FOR TENSIONED RETAINING RINGS

[75] Inventors: Karl Komlos, Selters; Radu Mihalcea, Hückelhoven, both of Fed. Rep. of Germany

[73] Assignee: Seeger-Orbis GmbH, Konigstein/Taunus, Fed. Rep. of Germany

[21] Appl. No.: 337,951

[22] Filed: Apr. 14, 1989

[30] Foreign Application Priority Data

Apr. 16, 1988 [DE] Fed. Rep. of Germany ....... 3812741

[51] Int. Cl.⁵ .................. B23Q 17/20; B23P 19/04
[52] U.S. Cl. ........................................ 29/705; 29/229; 73/849
[58] Field of Search ............... 29/225, 229, 235, 705, 29/759; 73/120, 161, 789, 849, 851, 862.65; 209/548; 242/7.01

[56] References Cited

U.S. PATENT DOCUMENTS

| | | | |
|---|---|---|---|
| 2,422,065 | 6/1947 | Anselmi | 29/235 |
| 3,101,528 | 8/1963 | Erdmann | 29/759 X |
| 3,500,549 | 3/1970 | Smith | 73/849 X |
| 3,940,992 | 3/1976 | Jost et al. | 73/728 |
| 4,236,639 | 12/1980 | Boettge et al. | 209/548 X |
| 4,673,890 | 6/1987 | Copland et al. | 73/783 X |
| 4,746,393 | 5/1988 | Ephere et al. | 242/7.01 X |
| 4,796,474 | 1/1989 | Koenig | 73/862.65 |

FOREIGN PATENT DOCUMENTS

| | | |
|---|---|---|
| 1603927 | 1/1971 | Fed. Rep. of Germany . |
| 7524985 | 2/1977 | Fed. Rep. of Germany . |
| 3413478 | 10/1985 | Fed. Rep. of Germany . |
| 8534458 | 12/1985 | Fed. Rep. of Germany . |
| 777547 | 11/1980 | U.S.S.R. ......... 73/849 |
| 800344 | 8/1958 | United Kingdom . |

Primary Examiner—Joseph M. Gorski
Assistant Examiner—Peter D. B. Vo
Attorney, Agent, or Firm—Rosen, Dainow & Jacobs

[57] ABSTRACT

An assembly apparatus for retaining rings has a tensioning arrangement which includes a measuring arrangement for determining the tension force on a retaining ring and a further measuring arrangement for determining the diameter of the retaining ring in the tensioned condition. An assembly arrangement is provided for receiving the tensioned retaining ring and inserting it in a corresponding annular groove. The correct seating can be tested by controlled movement of the assembly head.

4 Claims, 3 Drawing Sheets

TENSIONING ASSEMBLY APPARATUS HAVING TRANSDUCERS MOUNTED ON THE PROJECTIONS FOR TENSIONED RETAINING RINGS

BACKGROUND OF THE INVENTION

This invention relates to an assembly apparatus for retaining rings.

An assembly apparatus of this type, as disclosed, for example, in DE-OS No. 3,413,478, is employed to mechanically insert slit radially resilient retaining rings in the respective annular grooves on a shaft or the like, or in a housing. The retaining ring has assembly holes that receive corresponding bolt projections of a clamping or tensioning arrangement. The retaining ring thereby extends radially and is positively held in at least one axial direction, and is oriented in a position suitable for assembly.

The clamping jaws employed in this arrangement are pivoted a predetermined extent with respect to one another by the movement of a prism, and the retaining ring is thereby radially tensioned. In this tensioned condition, the retaining ring is guided into a bore having a corresponding annular groove. Upon loosening the clamping jaws, the retaining ring snaps into the annular groove. The assembly apparatus is then moved back to its initial position. All movements are automatically controlled for the reception of a new retaining ring.

The above described assembly apparatus can only operate without failure in automatic operations, over an extended time, if the retaining rings are all identical. When using retaining rings from various sources, or when the retaining rings have small differences in cross section of the materials that are used, even insignificant deviations can arise in the radial tension force. In mass production, the resultant variations in radial seating, axial force carrying capacity, etc. of the retaining ring, are not acceptable, especially in the assembly of reliable, quality high grade products. Moreover it must also be expected that individual faulty retaining rings may be inadvertently assembled, since the unsatisfactory seating of retaining rings, in the known assembly apparatus, as a result of improper tension forces during the tensioning about the constant radial path, may not be noticeable.

Furthermore it can not be assured, in the above described apparatus, whether or not the retaining ring guided thereby is actually snapped into the annular groove

SUMMARY OF THE INVENTION

The object of this invention is the provision of an assembly apparatus for retaining rings, of the above type, that always achieves the same results in mass production, with regard to fixed and reliable seating of the retaining ring, and that can separate or reject retaining rings that are defective, faulty, and/or have other characteristics that are outside of given specifications.

The object of the invention is achieved by the provision of an assembly apparatus having a transducer measuring system for determining the diameter of the tensioned retaining ring and by the provision of a force measuring system for determining the tension force in the retaining ring in the tensioned state.

By employing the two measuring systems, in accordance with the invention, on the one hand, it is possible to always stress the retaining rings to the same diameter. This diameter is determined by the diameter of the shaft or of the housing seat, and is essentially limited by the characteristics of the retaining ring. The diameter of the retaining ring may be determined, for example, by a commercial measuring transducer, which, dependent upon the size of the retaining ring, can be mounted on a measuring lever. The measured values are applied to a conventional electronic measuring system as measured voltages, for use in controlling the apparatus.

The tensioning arrangement in the retaining ring is provided, on the other hand, with measuring transducers, for example wire strain gauges, for the measurment of the tension force. In this manner the tension from the reaction force extending outwardly from the retaining ring is measured and applied in the same manner to an electronic measuring system as an electrical voltage value.

The provision of two measured values enables several possible alternatives for the arrangement, e.g. to determine whether the retaining ring is suitably installed, whether it is fault free, has the correct specification, is tensioned in the necessary manner, and/or has the necessary tension force. Thereby, for example, the tension of a tensioned retaining ring is measured at a given diameter and compared with a predetermined measuring value that has been applied to the measuring instrument. Retaining rings having tension forces that are over or under this rated value, are discarded, i.e. not assembled.

Alternatively is it possible to tension the retaining ring with a constant tension force, thereby to ascertain the diameter and to compare this to a rated value.

Furthermore the quotient of the measured values of the diameter and tension force can also be calculated in the electronic measuring system, in order to be able to learn about the whole tension region of the retaining ring. Techniques for the use of the measured values for the selection of the retaining ring with respect to preset limit values, etc. are sufficiently well known to an expert and therefore need not be specifically described herein. Due to the provision of an assembly apparatus in accordance with the invention, it is ensured in all cases that the retaining ring:

is tensioned to a suitable diameter
has the necessary tension force
is exceptionally fault free
has the correct size in order to name only the most important criteria.

In accordance with a further feature of the invention, the tension arrangement has three circumferentially distributed axially extending radially movable projections that hold and tension the retaining rings. Each projection has a radial bearing acting against the respective tension surface of the retaining ring, and a force transducer is mounted on each bearing ring. If, in the apparatus in accordance with the invention, a clear separation is provided between the tensioning and assembly steps, it is possible to provide the tensioning arrangement with projections which act against the tension force, i.e. within the slits in the retaining rings for shafts, etc, or outside of retaining rings adapted to be inserted in grooves in bore surfaces. Radial bearings on the projections thereby effect the same radial force without the effect of friction.

If it is subsequently determined that the tension of the retaining ring in the tensioning arrangement is within the predetermined tolerance limits, it is then transferred to the assembly head in the tensioned condition. The tension head has, for example, suitable projections adapted to engage assembly holes in the retaining ring. Furthermore support surfaces are provided on the assembly head for position stabilization. The assembly head is now in position to transport the retaining ring axially to the annular groove. The appropriate displacement movement is applied in a known manner, so that the retaining ring accurately faces the annular groove but with the tension not yet released. In this position the retaining ring is separated from the assembly head by a stripping arrangement, and can snap into the annular groove.

The radial positions of the projections on the tensioned retaining ring are representative of the diameter of the retaining ring. Therefore, in accordance with a further feature of the invention, a radial position measuring transducer is provided on at least on one of the radially movable projections. It is consequently unnecessary to provide means for the direct measurement of the diameter of the tensioned surface of the retaining ring.

According to a further feature of the invention, the assembly head is provided with an axially fixedly positioned stripping arrangement for the retaining ring. The retaining ring can thereby be slid radially into the groove without any axial movement.

In one embodiment of the invention the assembly head has an arrangement for the testing of the correct seating of the retaining ring in the annular groove, by axial movement. The axial load carrying capacity of the inserted retaining ring can thereby be tested.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
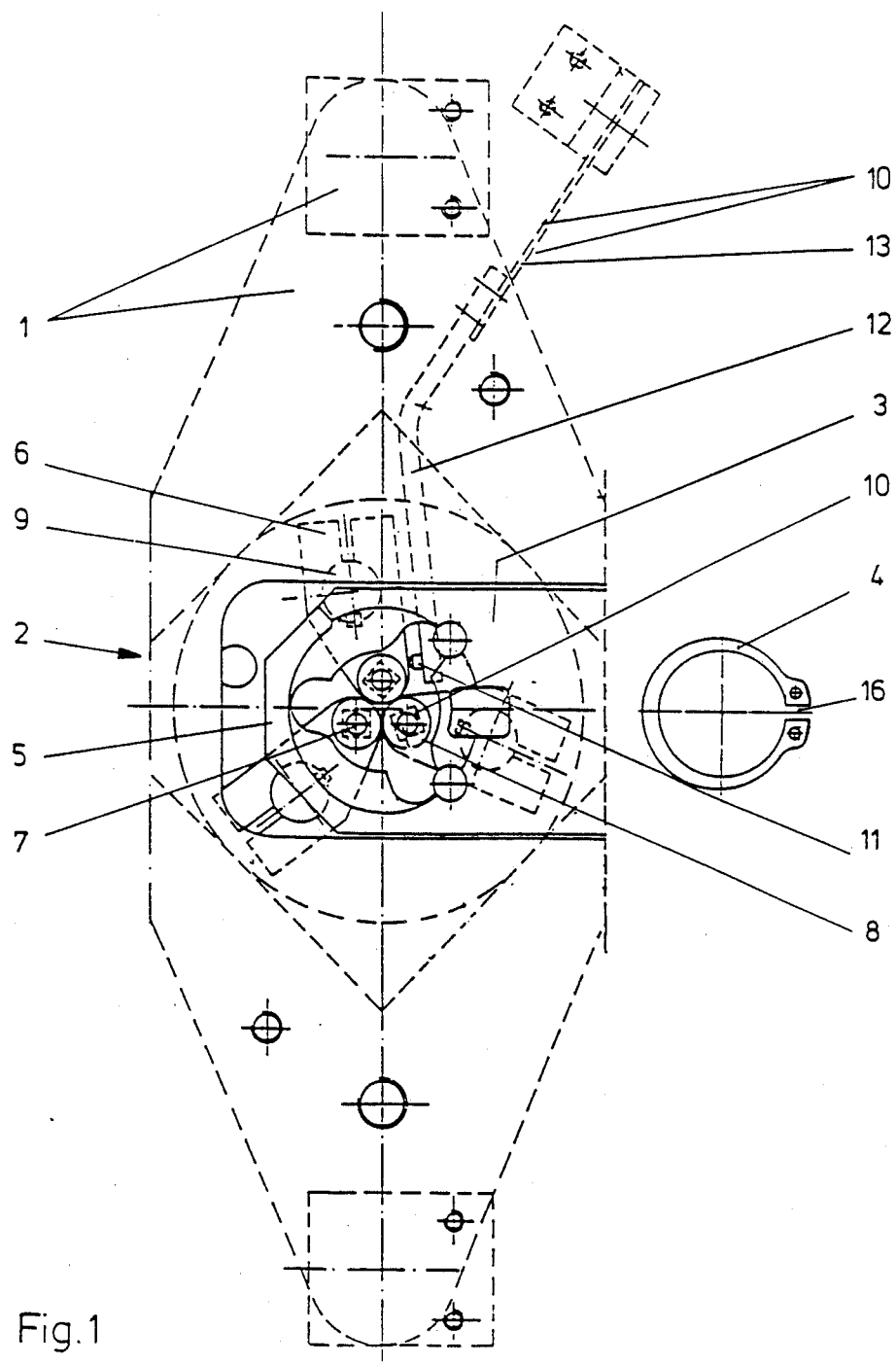
FIG. 1 is a partial plan view of the tensioning arrangement of an assembly apparatus for assembling retaining rings on a shaft.
Figure 2:
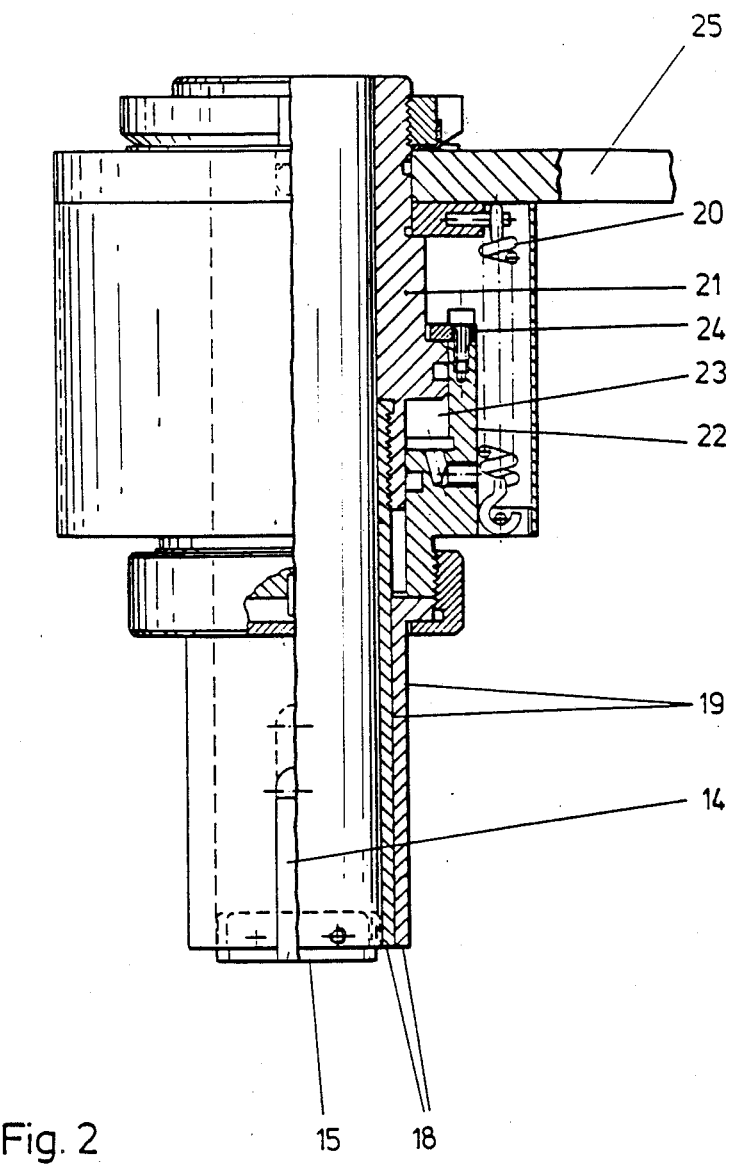
FIG. 2 is a partial longitudinal section of the assembly head for the tension arrangement of FIG. 1

The assembly apparatus, which is only partially illustrated in the drawings, is comprised essentially of the tensioning arrangement illustrated in FIG. 1 and the assembly head illustrated in FIG. 2. Indirectly referenced elements, such as supports, frames, moving and guide arrangements, etc., are omitted from the drawings. The retaining ring is not shown mounted in the tensioning arrangement in FIG. 1 of the drawing in order to more clearly stress the retaining ring operative arrangement.

The tensioning arrangement illustrated in FIG. 1 is comprised of frame support 1, a tensioning head 2 axially movable with respect thereto and a guide plate 3 for the retaining ring 4. These elements are aligned in the illustrated position and pushed coaxially by a guide arrangements (not illustrated) to engage a stop 5. There are three circumferentially distributed tensioning levers 6 which are provided with axial projections 7 on their radially inner ends. Radial bearings 8 are provided on the projections 7. The tensioning levers 6 are pivotable about the respective bolts 9 by a suitable drive (not illustrated). As a result of synchronous pivotal movement of the tensioning levers in the counterclockwise direction, the spacing between the radial bearings 8 increases with respect to the center point of the tensioning head. This movement is used for tensioning the retaining ring 4. Upon appropriate axial movement of the tensioning head 2; the radial bearings are pushed into the bore of the retaining ring 4 which, as above described, is coaxial with the tensioning head. Due to the synchronous pivoting of the tensioning levers 6, the outer rings of the radial bearings 8 come into contact with the retaining ring and tension it radially outwardly upon further pivotal movement.

Wire strain gauges 10, designated by dashed blocks, are mounted on the projections 7. Upon loading of the projections 7 in the bending direction, the strain gauges together with a known electronic meter (not illustrated) develop an electric voltage. The radial tension force of the retaining ring 4 can thereby be determined.

Furthermore one of the tension arms 6 has a lever arm 12 with a testpoint 11, serving for the measurement of the radial position of the projection 7 during the tensioning of the retaining ring 4. The diameter of the tensioned retaining ring 4 can thereby be determined. The wire strain gauge 10 serves as a measuring transducer, and is clamped in conventional manner on a bending strip 13 of spring steel. It is connected to a measuring amplifier, which produces an electrical voltage proportional to the diameter of the retaining ring.

Figure 3:
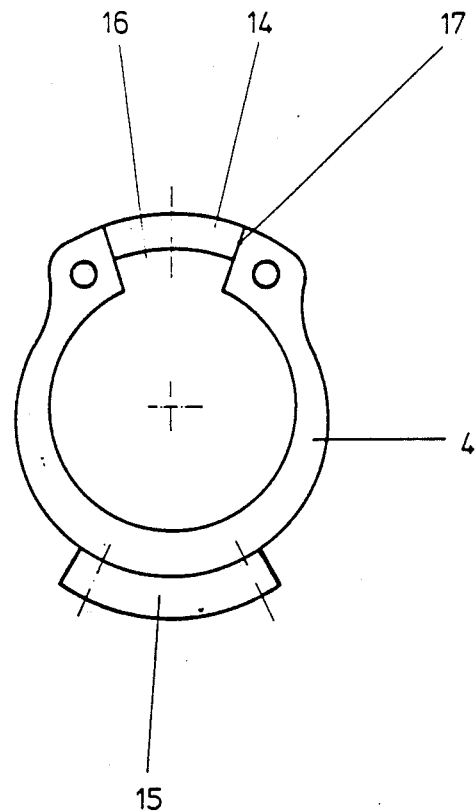
FIG. 3 is a partial enlarged view of a retaining ring tensioned by the assembly head of FIG. 2.

The assembly head illustrated in FIGS. 2 and 3 serves a an assembly tool for the assembly of the retaining ring 4 in a corresponding groove of a shaft (not illustrated). The assembly head receives the tensioned retaining ring from the tensioning arrangement illustrated in FIG. 1. Interchangeable projections 14, 15 are provided on the end thereof, and are positioned corresponding to the retaining ring 4. The spreading projection 14 in the center of the illustration engage the widened slit 16 of the tensioned retaining ring 4 and is sufficiently broad in the circumferential direction that the necessary spacing or width of the slit is maintained. This is especially evident in FIG. 3, wherein the further assembly parts of the assembly head have been omitted. Diametrically opposite the projection 14 is a partial shell shaped support projection 15, which supports the outer surface of the retaining ring. Due to the widening of the slit 16, the side surfaces thereof define an acute angle with respect to one another, in which the side surfaces 17 of the spreading projection is fit. The retaining ring 4 consequently has a tendency to push against the support projection 15 and engage the projection with prestress. Axially the retaining ring 4 is stabilized by the engagement with the end surface 18 of the assembly head. This surface is essentially the end surface of two coaxial assembly sleeves 19, mounted to be axially moveable against the force of a spring 20.

The assembly sleeves 19 are mounted to be moved by a piston 21 of cylinder unit 22 having a cylinder space 23 for a pressure medium. The application of pressure to the pressure medium produces the illustrated position of the assembly head, wherein the spring 20 is stretched and the end surfaces 18 of both assembly sleeves 19 are flush. A stop ring 24 limits the relative posiion of the assembly sleeve 19. A carrying arm 25, which is fixedly connected to the inner assembly sleeve, guides the whole assembly head with the retaining ring (not illustrated in FIG. 2) over a shaft (also not illustrated), until the retaining ring 4 is positioned opposite the annular groove in the shaft. At this position the pressure of the pressure medium is removed, whereby the spring 20 withdraws the outer assembly sleeve 19, and the projection 14 and support projection 15 connected thereto. Since the inner assembly sleeve 19 remains at a fixed position with respect to the shaft, the retaining ring positively latches in the annular groove.

The now released retaining ring 4 is still in contact only with the end surface 18 of the inner sleeve 19. As a result of a further axial movement of the assembly head with respect to the fixed positioned shaft, under limited axial force, the seating of the retaining ring 4 in the annular groove is tested. If it is not latched, it is pushed on the surface of the shaft under the axial force of the assembly head. Thereby an axial movement of the assembly head occurs, which, as not shown in detail, is registered by the control system of the assembly apparatus.

All movements are controlled and supervised from one central processor in a known manner. In addition to the here illustrated and described assembly arrangement for retaining rings for shafts, it is also possible to provide an arrangement for retaining rings for bores having the features of the invention, and with similar advantages. The projections of the tension arrangement act in this case against the outer surface of the retaining ring. Since the retaining ring in this case is pushed radially inwardly in the tensioned condition, it is advantageous to provide an assembly head with projections which engage the assembly holes of the retaining rings, in order to hold them in tension.

While the invention has been disclosed and described with reference to a single embodiment, it will be apparent that variations and modification may be made therein, and it is therefore intended in the following claims to cover each such variation and modification as falls within the true spirit and scope of the invention.

What is claimed:

1. An assembly apparatus for retaining rings, comprising a tensioning arrangement apparatus for applying controlled tension to a retaining ring and an assembly head for receiving a tensioned retaining ring and guiding it into an annular groove, said tensioning arrangement apparatus comprising
   a position measuring system for determining a diameter of the tensioned retaining ring in the tensioning arrangement apparatus,
   a force measuring system for determining a tension force of said retaining ring in a tensioned condition, and
   projections with force transducers mounted thereon, the projections being distributed about the circumference of the tensioning arrangement apparatus, extending axially into and radially movable with said assembly head, each projection having a radial bearing mounted thereon, which presses against a corresponding tension surface of said tensioned retaining ring which is positioned against radial bearings when the projections are in said assembly head.

2. The assembly apparatus of claim 1 wherein said position measuring system comprises a radial position measuring displacement transducer on at least one of the radially movable projections.

3. The assembly apparatus of claim 1 wherein the assembly head comprises an axially fixed stripping arrangement.

4. The assembly apparatus of claim 1 wherein the assembly head has an arrangement for testing a correct seating of the retaining ring in said annular groove by axially loading said retaining ring.

* * * * *

UNITED STATES PATENT AND TRADEMARK OFFICE
CERTIFICATE OF CORRECTION

PATENT NO. : 4,965,926

DATED : October 30, 1990

INVENTOR(S) : Karl Komlos and Radu Mihalcea

It is certified that error appears in the above-identified patent and that said Letters Patent is hereby corrected as shown below:

Column 1, line 53, change "cf" to --of--.

Column 4, line 30, change "a" to --as--.

Column 4, line 62, change "posiion" to --position--.

Column 6, line 19, change "with" to --within--.

Signed and Sealed this

Second Day of March, 1993

*Attest:*

STEPHEN G. KUNIN

*Attesting Officer*      *Acting Commissioner of Patents and Trademarks*